(12) United States Patent
Hsu

(10) Patent No.: US 10,550,880 B2
(45) Date of Patent: Feb. 4, 2020

(54) HINGE MODULE FOR A FOLDABLE TYPE DEVICE

(71) Applicant: Jarllytec Co., Ltd, New Taipei (TW)

(72) Inventor: Yu-Tsun Hsu, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 16/356,576

(22) Filed: Mar. 18, 2019

(65) Prior Publication Data

US 2019/0390703 A1 Dec. 26, 2019

(30) Foreign Application Priority Data

Jun. 21, 2018 (TW) .............................. 107121384 A

(51) Int. Cl.

| | | |
|---|---|---|
| *E05D 11/08* | (2006.01) | |
| *E05D 1/04* | (2006.01) | |
| *F16C 11/04* | (2006.01) | |
| *G06F 1/16* | (2006.01) | |

(52) U.S. Cl.
CPC .............. *F16C 11/04* (2013.01); *E05D 1/04* (2013.01); *E05D 11/082* (2013.01); *E05Y 2900/606* (2013.01); *G06F 1/1616* (2013.01); *G06F 1/1681* (2013.01)

(58) Field of Classification Search
CPC ................ G06F 1/1681; G06F 1/1616; E05Y 2900/606; E05Y 2201/26; H04M 1/0216; E05D 11/082; E05D 11/084; E05D 11/085; E05D 3/02; E05D 5/14; E05D 2005/145; E05D 1/04; F16C 11/04; Y10T 16/54038; Y10T 16/542
See application file for complete search history.

(56) References Cited

U.S. PATENT DOCUMENTS 8,804,349 B2 * 8/2014 Lee ........................ G06F 1/1641
361/749
9,173,288 B1 * 10/2015 Kim ....................... G06F 1/1633
9,250,733 B2  2/2016 Lee et al.
(Continued)

FOREIGN PATENT DOCUMENTS

| CN | 103576775 A | 2/2014 |
|---|---|---|
| CN | 105788452 A | 7/2016 |
| CN | 106205385 A | 12/2016 |

*Primary Examiner* — Chuck Y Mah
(74) *Attorney, Agent, or Firm* — Muncy, Geissler, Olds & Lowe, PC

(57) ABSTRACT

The present invention discloses a hinge module for a foldable type device. One end of the first turning member is connected to a first supporting member, and another end of the first turning member has a first semi-circular space for pivoting a semi-circular hinge set, and the first turning member has a first turning space and a first limiting space for respectively limiting the first supporting part of the center of the first swinging member and another end of the first swinging member. The another end of the first swinging member presses against a first elastic member, and one end of the first swinging member is connected to the first turning member. The second turning member has a second turning space and a second limiting space for respectively limiting the second supporting part of the center of the second swinging member and another end of the second swinging member.

8 Claims, 5 Drawing Sheets

(56) References Cited

U.S. PATENT DOCUMENTS

| | | | | |
|---|---|---|---|---|
| 9,348,450 | B1* | 5/2016 | Kim | G06F 1/1681 |
| 9,760,126 | B2* | 9/2017 | Shin | G06F 1/1652 |
| 9,958,976 | B2* | 5/2018 | Endo | G06F 1/1652 |
| 10,082,839 | B1* | 9/2018 | Turchin | G06F 1/1652 |
| 2014/0042293 | A1* | 2/2014 | Mok | G06F 1/1652 |
| | | | | 248/682 |
| 2015/0233162 | A1* | 8/2015 | Lee | H04M 1/02 |
| | | | | 16/223 |
| 2016/0227645 | A1* | 8/2016 | Hampton | G06F 1/1601 |
| 2017/0023985 | A1* | 1/2017 | Xin | G06F 1/1681 |
| 2018/0164855 | A1* | 6/2018 | Tazbaz | G06F 1/1681 |
| 2018/0210511 | A1* | 7/2018 | Lin | E05D 3/06 |
| 2019/0025887 | A1* | 1/2019 | Seo | G06F 1/1652 |
| 2019/0033925 | A1* | 1/2019 | Hong | E05D 7/00 |
| 2019/0094917 | A1* | 3/2019 | Schmelzle | F16C 11/04 |
| 2019/0179373 | A1* | 6/2019 | Cheng | F16C 11/12 |
| 2019/0264483 | A1* | 8/2019 | Maatta | G06F 1/1681 |
| 2019/0301215 | A1* | 10/2019 | Siddiqui | E05D 5/04 |

* cited by examiner

HINGE MODULE FOR A FOLDABLE TYPE DEVICE

FIELD OF THE INVENTION

The present invention relates to a hinge device, and more particularly to a hinge module for a foldable type electronic device.

BACKGROUND OF THE INVENTION

The conventional foldable electronic devices, such as a foldable display, mainly connects the sides of the support members of display units through a split shaft or a multi-axis shaft to form a pivoting connection, thereby making the flexible display or each display unit folded or unfolded. Since the current electronic devices are mainly designed to be thinner in order to be carried by users, the spacing between two bodies that can be reserved for the hinge would become narrower and narrower, and the dimensional requirements for the hinge are bound to be reduced. For example, the Chinese Patent entitled with "A Foldable display" with No. CN105788452A has disclosed a foldable structure of a hinge, which mainly has a first body and a third body of the hinge respectively connected to a first supporting member and a second supporting member, and has the first supporting member and the second supporting member combined with a flexible display module. Thus, the flexible display module on the first supporting member and the second supporting member are folded after the first body and the third body are turned relative to the second body. However, the first body and the third body of the hinge foldable structure mentioned above are turned with reference to the two ends of the second body. Since it is necessary to provide a structure on the second body that allows the first and third bodies to turn, the spacing between the two bodies that can be reserved for the hinge cannot be effectively reduced.

As shown in the three patents of CN103576775A, CN106205385A and U.S. Pat. No. 9,250,733B, the two bodies are formed in a relatively foldable manner by a biaxial shaft or an approximately biaxial-shaft structure. The "support structure" in these three patents has its one end therein pivoted and the other end movable. When the entire "foldable device" is folded, each supporting structure in the two bodies is driven by another force exerting member, for example, spring, tension spring, magnetic iron, and torsion spring so as to form an accommodation space therein for accommodating the curved center of the flexible display, and the unfolded center of the flexible display is supported by the respective support structures when the entire foldable device is unfolded.

SUMMARY OF THE INVENTION

However, the structural design of the patent CN105788452A will make the overall volume larger, which is not only unfavorable to the overall design of the electronic device, but also does not meet the market requirement for the overall volume gradually to be lighter and thinner. The distance between the two axes in these three patents of CN103576775A, CN106205385A and U.S. Pat. No. 9,250, 733B are still affected by the sizes of other components, so that the distance between the two axes are not easily reduced, and the overall volume cannot be effectively reduced. In view of this, In order to provide a structure different from prior art and to improve the above disadvantages, the inventor has continuously research, and the present invention is provided.

An object of the present invention is to provide a hinge module capable of solving the technical problem that the overall size of the hinge foldable structure is too large and is not conducive to the overall design by allowing a first turning member, a second turning member and a semi-circular hinge set to share the same rotating center, and such arrangement can effectively reduce the spacing between the two bodies when being folded, so as to reduce the overall volume and such arrangement is beneficial to the overall design and can meet the market requirement for thinner structure. The difference that the present invention differs from the previous patents is that no end is pivotally connected by adopting a seesaw-like structure, so that the accommodating space can accommodate the curved center of the flexible display when being folded and the unfolded center of the flexible display can be supported when being unfolded by such arrangement.

In order to fulfill above purpose, the hinge module for a foldable type device of the present invention is respectively connected with a first supporting member and a second supporting member for moving the first supporting member and the second supporting member in a linkage way, so as to have the first supporting member and the second supporting member turned in an opposite direction. The first supporting member and the second supporting member simultaneously connected to a flexible display. The hinge module comprises a first turning member, a first swinging member, a second turning member, a second swinging member and a semi-circular hinge set. The first turning member includes a first base and a first cover plate, where one end of the first base is connected to the first supporting member, another end of the first base has a first semi-circular space, a first turning space and a first limiting space are provided in the first turning member. One end of the first swinging member is connected to the first cover plate, and another end of the first swinging member is limited in the first limiting space and presses against a first elastic member, the first swinging member has a middle part and the middle part provided with a first supporting part, the first supporting part is positioned in the first turning space so as to have two ends of the first swinging member swung in a reverse direction. The second turning member includes a second base and a second cover plate, where one end of the second base is connected to the second supporting member, a second turning space and a second limiting space are provided in the second base. One end of the second swinging member is connected to the second cover plate, and another end of the second swinging member is limited in the second limiting space and presses against a second elastic member, the second swinging member has a middle part and the middle part provided with a second supporting part, the second supporting part is positioned in the second turning space so as to have two ends of the second swinging member swung in a reverse direction. The semi-circular hinge set is pivotally positioned in the first semi-circular space of the first turning member so as to have the first turning member and the second turning member turned in an opposite direction.

In an implementation, the first base includes a first end portion and a first body, one end of the first end portion is connected to the first supporting member, and another end of the first end portion has a first cover part, the first end portion has the first turning space and the first limiting space; the first body is connected to the first end portion, and one end of the first body has the first semi-circular space.

In an implementation, the first supporting part is a protrusion having a first outer curved surface, and the first turning space has a first inner curved surface for supporting the first outer curved surface.

In an implementation, the second base includes a second end portion and a second body, one end of the second end portion is connected to the second supporting member, another end of the second end portion has a second cover part, the second end portion has the second turning space and the second limiting space; the second body is connected to the second end portion.

In an implementation, the second supporting part is a protrusion having a second outer curved surface, and the second turning space has a second inner curved surface for supporting the second outer curved surface.

In an implementation, one end of the first body has a first semi-annular body, the first semi-annular body has the first semi-circular space, and the semi-circular hinge set includes a first semi-circular shaft and a semi-circular sleeve; the first semi-circular shaft is positioned in the first semi-circular space, and the semi-circular sleeve is connected to the first semi-circular shaft, and one end of the semi-circular sleeve has a second semi-circular shaft and a second semi-annular body that are coaxial, the second semi-circular shaft abuts the first semi-circular shaft, and between the second semi-circular shaft and the second semi-annular body is provided with a first semi-annular groove into which the first semi-annular body inserts; a second semi-annular body is provided on one side of the second end portion, and another end of the semi-circular sleeve has a third semi-circular shaft and a fourth semi-annular body that are coaxial, between the third semi-circular shaft and the fourth semi-annular body is provided with a second semi-annular groove into which the second semi-annular body of the second end portion inserts.

In an implementation, the semi-circular hinge set further includes a connecting member for connecting the first semi-circular shaft with the semi-circular sleeve.

In an implementation, one side of the first semi-annular body has a pressing part, and the pressing part extends into the first semi-circular space, the semi-circular sleeve has at least one mounting hole, and the mounting hole has a spring pin therein, a peripheries of the spring pin presses against the pressing part.

The present invention will be understood more fully by reference to the detailed description of the drawings and the preferred embodiments below.

DETAILED DESCRIPTIONS OF PREFERRED EMBODIMENTS

Figure 1:
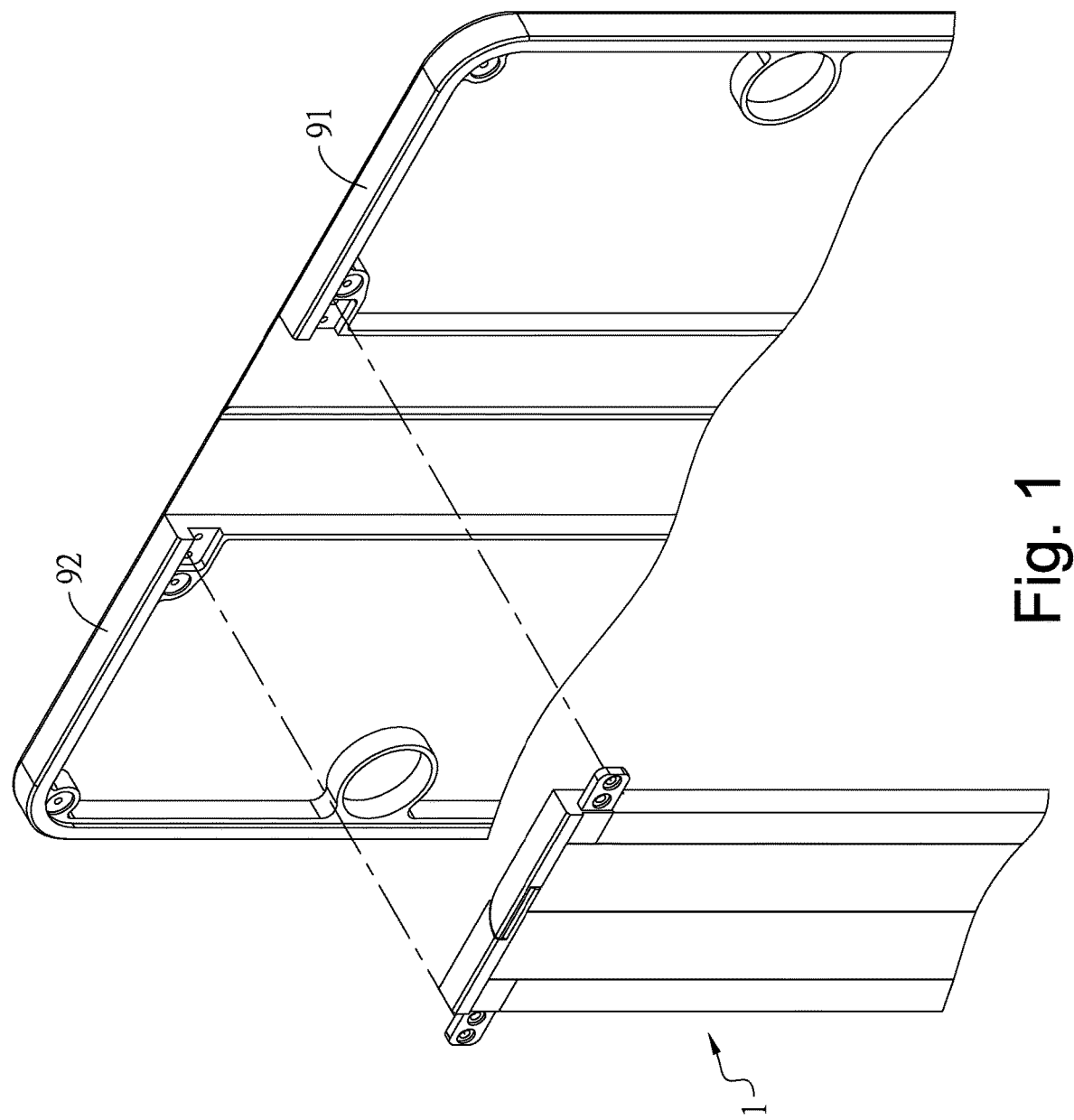
FIG. 1 is an exploded view showing a preferred embodiment of the hinge module of the present invention when be connected with the first supporting member and the second supporting member.
Figure 3:
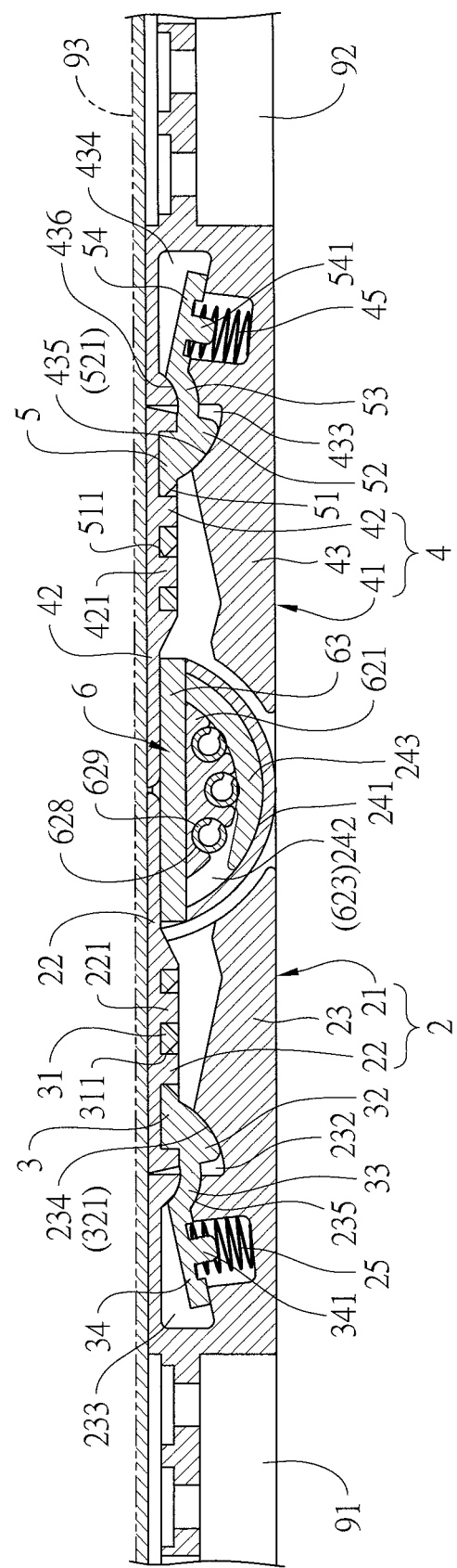
FIG. 3 is a cross-sectional view showing a preferred embodiment of the hinge module of the present invention when being unfolded.
Figure 4:
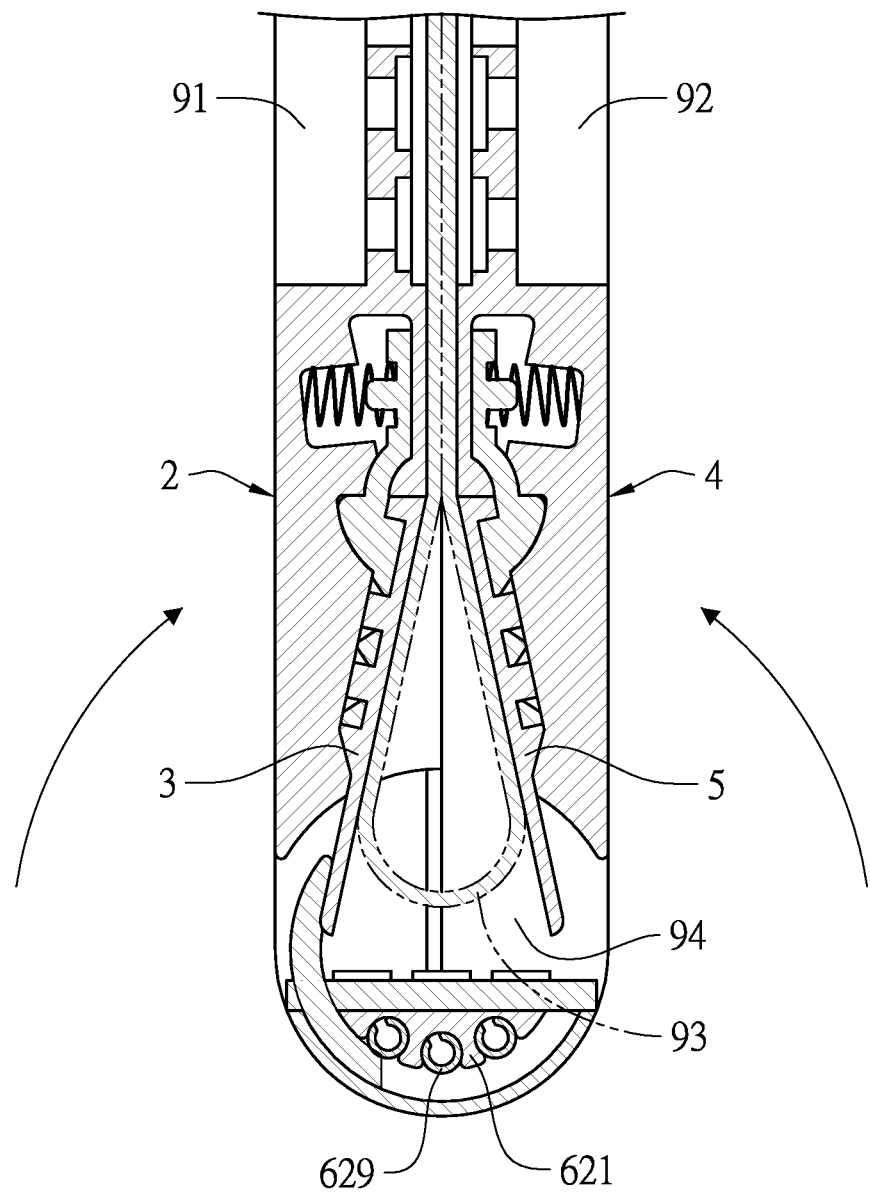
FIG. 4 is a cross-sectional view showing a preferred embodiment of the hinge module of the present invention when being folded.
Figure 6:
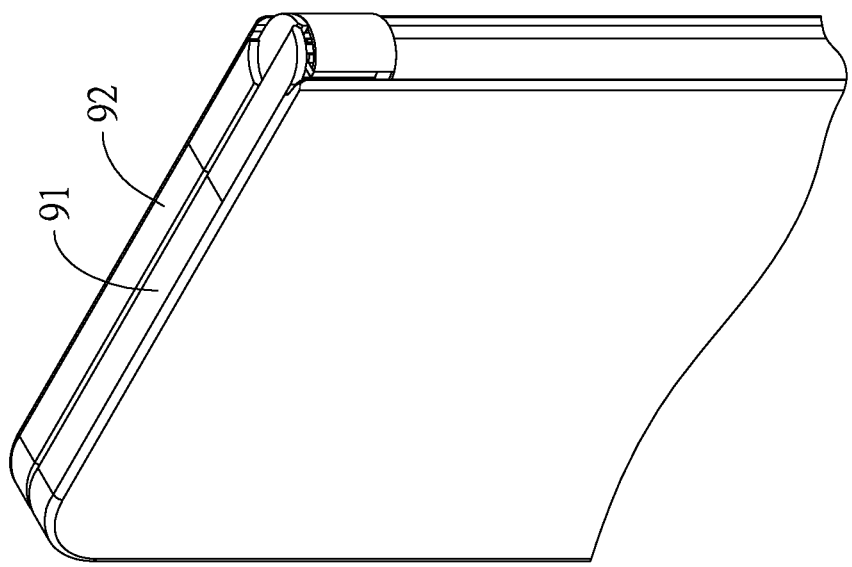
FIG. 6 is a perspective view showing the three-dimensional appearance when being connected to the first support member and the second support member and folded according to a preferred embodiment of the hinge module of the present invention.
Figure 5:
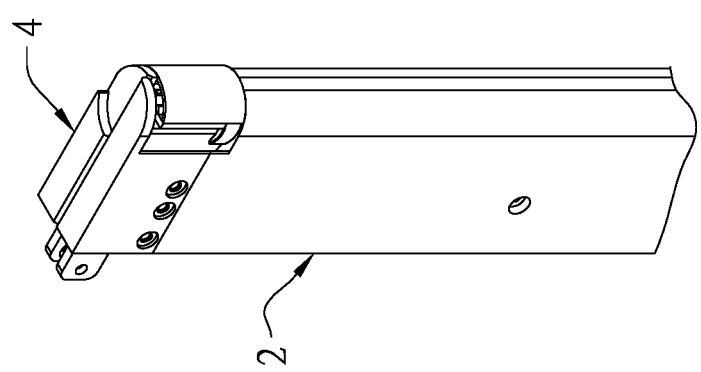
FIG. 5 is a perspective view showing the three-dimensional appearance of the preferred embodiment of the hinge module of the present invention when being folded.

Referring to FIG. 1, a hinge module 1 for a foldable type device of the present invention is respectively connected with a first supporting member 91 and a second supporting member 92 for moving the first supporting member 91 and the second supporting member 92 with each other, so as to have the first support member 91 and the second support member 92 turned in an opposite direction. As shown in FIGS. 3 and 4, one surface of the first supporting member 91 and one surface of the second supporting member 92 are respectively connected to the two halves of a flexible display 93, so that the flexible display 93 can be folded or unfolded relatively. When the device of the present invention is folded, an accommodating space 94 can be formed at the intersection of the first supporting member 91 and the second supporting member 92 to accommodate the curved center of the flexible display 93.

Figure 2:
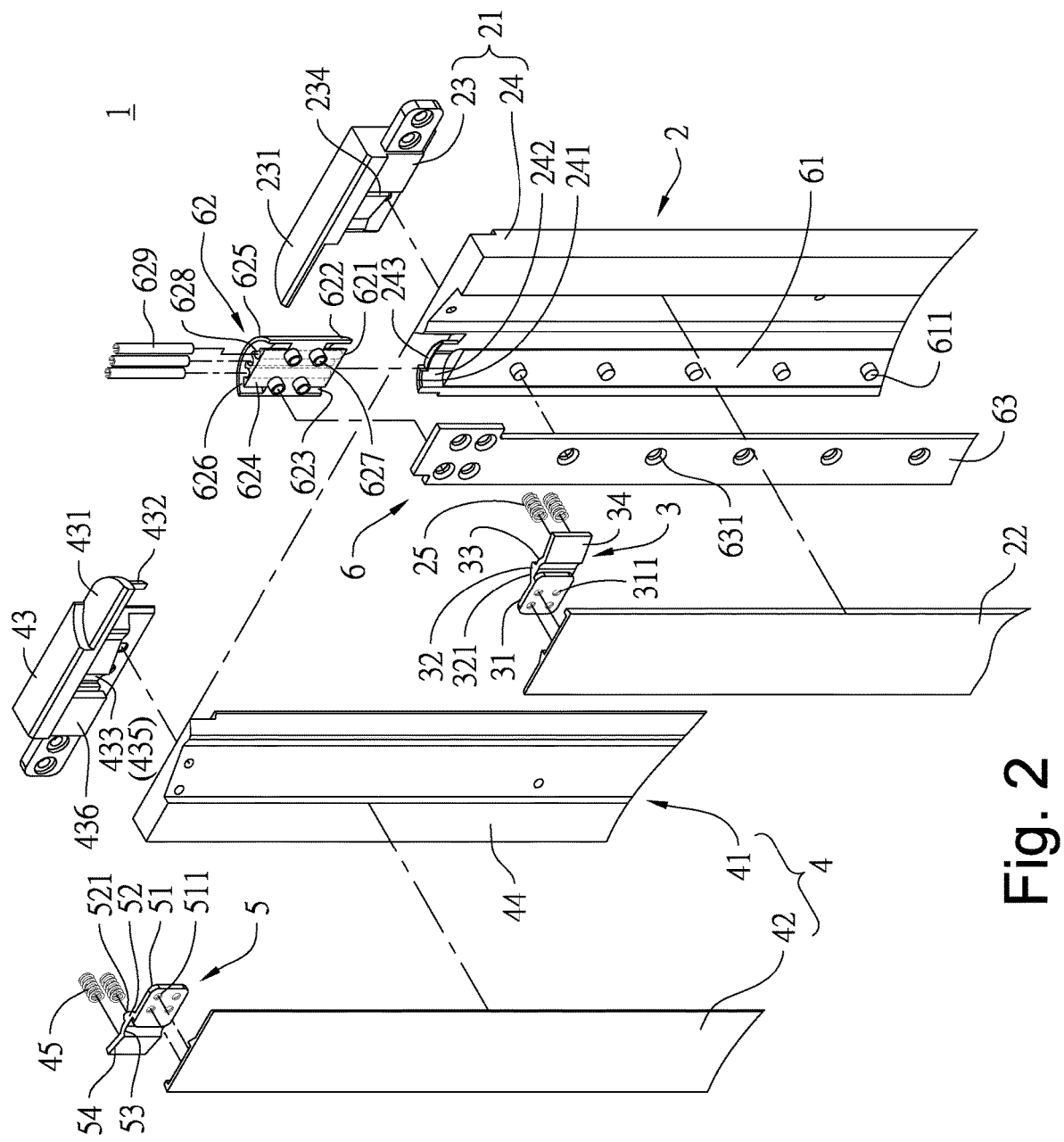
FIG. 2 is an exploded view of the preferred embodiment of the hinge module of the present invention.

As shown in FIGS. 2 and 3, the preferred embodiment of the hinge module 1 for a foldable type device of the present invention comprises a first turning member 2, a first swinging member 3, and a second turning member 4, a second swinging member 5 and a semi-circular hinge set 6.

The first turning member 2 includes a first base 21 and a first cover plate 22, and the first base 21 includes a first end portion 23 and a first body 24, and one end the first end portion 23 is locked to the first supporting member 91, another end of the first end portion 23 has a first cover part 231 in curved plate shape. The first end portion 23 has a first turning space 232 and a first limiting space 233. The first turning space 232 has a first inner curved surface 234, and the first limiting space 233 has a slot to receive and position a compression spring, and the compression spring is used as the first elastic member 25. The first limiting space 233 and the first turning space 232 are in communication with each other through a first curved passage 235. The first body 24 is connected to one end of the first end portion 23 in a way of lap joint. One end of the first body 24 has a first semi-annular body 241, and the first semi-annular body 241 has a first semi-circular space 242. One side of the first semi-annular body 241 has a pressing part 243, and the pressing part 243 extends into the first semi-circular space 242. The first cover plate 22 is disposed opposite to the first base 21, so that one side of the first cover plate 22 is on the same plane as one side of the first base 21 to connect one part of the flexible display 93. The other side of the first cover plate 22 has a plurality of blocks 221.

The first swinging member 3 is a plate body, and includes a first plate 31, a first supporting part 32, a first curved part 33 and a second plate 34 extending in sequence. On the plate surface of the first plate 31 is provided with a plurality of holes 311 into which the plurality of blocks 221 of the first cover plate 22 is respectively inserted. The first supporting part 32 is a protrusion having a first outer curved surface 321 for being received in the first turning space 232 of the first end portion 23 and correspondingly pressing the first inner curved surface 234, thereby allowing two ends of the first swinging member 3 to swing in a reverse direction. The first curved portion 33 is correspondingly received in the first curved passage 235 of the first end portion 23; and the second plate 34 is limited to be located in the first limiting space 233 of the first end portion 23, the plate surface of the second plate 34 has a protruding pillar 341 for being sleeved by the one end of the first elastic member 25.

The second turning member 4 includes a second base 41 and a second cover plate 42. The second base 41 includes a second end portion 43 and a second body 44. One end of the second end portion 43 is locked to the second supporting member 92. Another end of the second end portion 43 has a second cover part 431 in a curved plate shape, and one side of the second cover part 431 has a second semi-annular body 432. The second end portion 43 has a second turning space 433 and a second limiting space 434. The second turning space 433 has a second inner curved surface 435, and the second limiting space 434 has a concave slot to receive and position a compression spring, and the compression spring is used as the second elastic member 45. The second limiting space 434 and the second turning space 433 are communicated with each other through a second curved passage 436. The second body 44 is connected to one end of the second end portion 43 in a way of lap joint. The second cover plate 42 is disposed opposite to the second base 41, such that one surface of the second cover plate 42 and one surface of the second base 41 are in the same plane to connect one part of the flexible display 93. The other side of the second cover plate 42 has a plurality of blocks 421.

The second swinging member 5 is a plate body, and includes a third plate 51, a second supporting part 52, a second curved part 53 and a fourth plate 54 extending in sequence. On the plate surface of the third plate 51 is provided with a plurality of holes 511 into which the plurality of blocks 421 of the second cover plate 42 is respectively inserted. The second supporting part 52 is a protrusion having a second outer curved surface 521 for being received in the second turning space 433 of the second end portion 42 and correspondingly pressing the second inner curved surface 435, thereby the two ends of the second swinging member 5 can be swung in a reverse direction. The second curved part 53 is correspondingly received in the second curved passage 436 of the second end portion 42. The fourth plate 54 is limited in the second limiting space 434 of the second end portion 42. A protruding pillar 541 is provided on the plate surface of the fourth plate 54 for being sleeved by the one end of the second elastic member 45.

The semi-circular hinge set 6 includes a first semi-circular shaft 61, a half-circular sleeve 62 and a connecting member 63. The first semi-circular shaft 61 is pivotally positioned in the first semi-circular space 242 of the first body 24. A plurality of protruding pillars 611 is arranged at intervals on one plane of the first semi-circular shaft 61. One end of the semi-circular sleeve 62 has a second semi-circular shaft 621 and a third semi-annular body 622 that are coaxial. One end of the second semi-circular shaft 621 is butted to one end of the first semi-circular shaft 61, and between the second semi-circular shaft 621 and the third semi-annular body 622 is provided with the first semi-annular slot 623 into which the first semi-annular body 241 of the first body 24 inserts. Another end of the semi-circular sleeve 62 has a third semi-circular shaft 624 and a fourth semi-annular body 625 that are coaxial. Between the third semi-circular shaft 624 and the fourth semi-annular body 625 is provided with a second semi-annular slot 626 into which the second semi-annular body 432 of the second end portion 43 inserts. A plurality of protruding pillars 627 is arranged at intervals on one plane of the semi-circular sleeve 62. The semi-circular sleeve 62 further has three mounting holes 628 in an arcuate shape, and each of the mounting holes 628 into which a spring pin 629 inserts. The peripheries of each spring pin 629 respectively press against the edge of the pressing part 243 of the first body 24 and the inner side of the second semi-annular body 432 of the second end portion 43. The connecting member 63 is an elongated plate. On the plate surface of the connecting member 63 is provided with a plurality of positioning holes 631 through which the plurality of protruding pillars 627 of semi-circular sleeve 62 and the plurality of protruding pillars 611 of the first semi-circular shaft 61 pass, so as to connect to the semi-circular sleeve 62 and the first semi-circular shaft 61.

Therefore, as shown in FIGS. 2, 4-6, when the first supporting member 91 and the second supporting member 92 are turned in an opposite direction, the first supporting member 91 is folded and turned relative to the second supporting member 92 by having the first semi-circular shaft 61 and the second semi-circular shaft 621 pivoted to the first turning member 2 and the third semi-circular shaft 624 pivoted to the second turning member 4. The elastic support function is generated through a plurality of spring pins 629 to fill the gaps, and the plurality of spring pins 629 can be pressed during the relative movement to elastically change the respective outer diameters and store the elastic force to form elasticity, so as to reduce the shaking and produce turning friction, thereby providing frictional torque, so that the first supporting member 91 and the second supporting member 92 can freely stop at a certain angle while being turned. When the device of the present invention is folded, an accommodating space 94 is provided between the first turning member 2 and the second turning member 4 to accommodate a curved center of the flexible display 93 through the function similar to a seesaw produced by the first swinging member 3 and the second swinging member 5.

Accordingly, the present invention has the following advantages:

1. The device of the present invention can make the first turning member, the second turning member and the semi-circular hinge set share the same rotation center when be unfolded, so that the spacing between the first supporting member and the second supporting member when being folded can be effectively reduced, so as to reduce the overall volume. Such arrangement is conducive to design and is able to achieve the market demand for thinner volume.
2. The first swinging member and the second swinging member of the present invention can generate a free swinging action similar to a seesaw when the device of the present invention is unfolded without having either end of which pivoted as in prior art. Therefore, when the device of the present invention is folded, an accommodating space can be provided to accommodate the curved center of the flexible display, and when the device of the present invention is unfolded, the unfolded center of the flexible display can be stably supported.
3. In the present invention, the plurality of mounting holes in an arcuate shape of the semi-circular sleeve is respectively inserted with the spring pins, and the peripheries of the spring pins respectively press against the edge of the pressing part of the first body and the second semi-annular of the second end portion. Therefore, the plurality of spring pins can provide an elastic supporting effect, so as to fill a gap between connecting elements or turning elements produced due to manufacturing tolerances. Such arrangement keeps the action of being folded or unfolded to move smoothly, and the device of the present invention can be installed with a proper amount of spring pins to meet requirements of different friction torque of different format.

The description referred to in the drawings and stated above is only for the preferred embodiments of the present invention. Many equivalent variations and modifications can still be made by those skilled in the field of the present invention without departing from the spirit of the present invention, so they should be regarded to fall into the scope defined by the appended claims.

What is claimed is:

1. A hinge module for a foldable type device, respectively connected with a first supporting member and a second supporting member for moving the first supporting member and the second supporting member in a linkage way, so as to have the first supporting member and the second supporting member turned in an opposite direction, and the first supporting member and the second supporting member simultaneously connected to a flexible display; the hinge module comprising:

a first turning member, including a first base and a first cover plate, where one end of the first base is connected to the first supporting member, another end of the first base has a first semi-circular space, the first base is provided with a first turning space and a first limiting space in communication with each other;

a first swinging member, one end of which is connected to the first cover plate, and another end of which is limited in the first limiting space and presses against a first elastic member, where the first swinging member has a middle part and the middle part is provided with a first supporting part, the first supporting part is positioned in the first turning space so as to have two ends of the first swinging member swung in a reverse direction;

a second turning member, including a second base and a second cover plate, where one end of the second base is connected to the second supporting member, the second base is provided with a second turning space and a second limiting space in communication with each other;

a second swinging member, one end of which is connected to the second cover plate, and another end of which is limited in the second limiting space and presses against a second elastic member, where the second swinging member has a middle part and the middle part is provided with a second supporting part, the second supporting part is positioned in the second turning space so as to have two ends of the second swinging member swung in a reverse direction;

a semi-circular hinge set, pivotally positioned in the first semi-circular space of the first turning member so as to have the first turning member and the second turning member turned in an opposite direction.

2. The hinge module for a foldable type device according to claim 1, wherein the first base includes a first end portion and a first body, one end of the first end portion is connected to the first supporting member, and another end of the first end portion has a first cover part, the first end portion has the first turning space and the first limiting space; wherein the first body is connected to the first end portion, and one end of the first body has the first semi-circular space.

3. The hinge module for a foldable type device according to claim 1, wherein the first supporting part is a protrusion having a first outer curved surface, and the first turning space has a first inner curved surface for supporting the first outer curved surface.

4. The hinge module for a foldable type device according to claim 2, wherein the second base includes a second end portion and a second body, one end of the second end portion is connected to the second supporting member, another end of the second end portion has a second cover part, the second end portion has the second turning space and the second limiting space; the second body is connected to the second end portion.

5. The hinge module for a foldable type device according to claim 4, wherein one end of the first body has a first semi-annular body, the first semi-annular body has the first semi-circular space, and the semi-circular hinge set includes a first semi-circular shaft and a semi-circular sleeve; the first semi-circular shaft is positioned in the first semi-circular space, and the semi-circular sleeve is connected to the first semi-circular shaft, and one end of the semi-circular sleeve has a second semi-circular shaft and a second semi-annular body that are coaxial, the second semi-circular shaft abuts the first semi-circular shaft, and between the second semi-circular shaft and the second semi-annular body is provided with a first semi-annular groove into which the first semi-annular body inserts; a second semi-annular body is provided on one side of the second end portion, and another end of the semi-circular sleeve has a third semi-circular shaft and a fourth semi-annular body that are coaxial, between the third semi-circular shaft and the fourth semi-annular body is provided with a second semi-annular groove into which the second semi-annular body of the second end portion is inserted.

6. The hinge module for a foldable type device according to claim 5, wherein the semi-circular hinge set further includes a connecting member for connecting the first semi-circular shaft with the semi-circular sleeve.

7. The hinge module for a foldable type device according to claim 5, wherein one side of the first semi-annular body has a pressing part, and the pressing part extends into the first semi-circular space, the semi-circular sleeve has at least one mounting hole, and the mounting hole has a spring pin therein, peripheries of the spring pin press against the pressing part.

8. The hinge module for a foldable type device according to claim 1, wherein the second supporting part is a protrusion having a second outer curved surface, and the second turning space has a second inner curved surface for supporting the second outer curved surface.

* * * * *